United States Patent [19]

Elkins

[11] Patent Number: 4,579,706

[45] Date of Patent: Apr. 1, 1986

[54] BLOCK MAKING MACHINE

[75] Inventor: Henry Elkins, Grants, N. Mex.

[73] Assignee: Adobe International, Inc., Grants, N. Mex.

[21] Appl. No.: 722,302

[22] Filed: Apr. 11, 1985

[51] Int. Cl.[4] .................................................. B29B 1/04

[52] U.S. Cl. ..................................... 264/124; 264/239; 425/62; 425/256; 425/346; 425/556; 425/579

[58] Field of Search ................. 425/62, 256, 257, 346, 425/357, 358, 556, 579; 264/109, 123, 124, 239, 256

[56] References Cited

U.S. PATENT DOCUMENTS

| | | | |
|---|---|---|---|
| 1,864,769 | 6/1932 | Slidell . | |
| 2,265,771 | 12/1941 | Davis | 25/56 |
| 2,388,679 | 11/1945 | Davis | 25/156 |
| 2,524,683 | 10/1950 | Sumpf | 25/41 |
| 2,537,920 | 1/1951 | Smith | 425/556 |
| 3,142,105 | 7/1964 | Weir et al. | 425/62 |
| 3,225,409 | 12/1965 | Huffaker | 25/41 |
| 4,153,404 | 5/1979 | Ottman | 425/256 |
| 4,310,293 | 1/1982 | Eggleton | 425/62 |

*Primary Examiner*—J. Howard Flint, Jr.

*Attorney, Agent, or Firm*—John J. Torrente

[57] ABSTRACT

Apparatus for making blocks from earth, soil or like material wherein a horizontally disposed channel is provided with a fill chamber and with a compression chamber downstream of the fill chamber and wherein further means is provided which, during a first cycle and while inhibiting further material from being supplied to the fill chamber, moves already supplied material from the fill chamber to the compression chamber to form a block and which, during a second cycle, enables further material to be supplied to the fill chamber.

21 Claims, 4 Drawing Figures

BLOCK MAKING MACHINE

BACKGROUND OF THE INVENTION

This invention relates to an apparatus and method for making blocks and, in particular, to an apparatus and method for making blocks from earth or soil materials Earth or soil materials such as, for example, adobe containing materials have long been used to make blocks in areas where arid conditions generally exist such as, for example, in the Southwest United States. Under these conditions, the blocks can be satisfactorily used to construct walls for homes and other buildings and structures.

The earliest procedure for making adobe blocks comprised placing the adobe mud in uniform sized wood forms and then allowing the sun to bake the mud. This procedure is still followed today and has been enhanced by the addition of stabilizing materials to the mud which enables the adobe blocks to better withstand the elements of wind and rain.

A disadvantage of the above procedure is that it usually requires the manufactured blocks to be transported from the manufacturing site to the construction site. Thus, in the Southwest, for example, blocks are made using this procedure in adobe yards primarily located along the more densely populated Rio Grande River corridor and in the Tucson, Phoenix, Arizona area. As a result, construction with adobe block any distance from this location becomes extremely expensive.

Furthermore, even for locations near the manufacturing site, the cost of using adobe block made by the sun baked method is still more expensive than the use of more modern conventional substitutes such as, for example, cinder block due to the increased labor expenses. As a result, a variety of attempts have been made to develop a less expensive means to construct adobe block than the sun baked method. These attempts have centered around developing machines which can be brought on-site and which can be used for immediate production of blocks through the use of existing on-site material or material transported to the site as unprepared soil. These prior art machines, typically, employ a ram or other type of compression member to compress the adobe material in a mold or compression chamber to the point of fusion.

U.S. Pat. No. 2,388,679 discloses an early machine of the type wherein a mold box carried on a wheeled chassis is used as the compression chamber. In this case, the adobe material is hand filled into the mold box and is compressed by a horizontally moving ram also supported on the chassis. The ram compresses the material to a preselected pressure which is stated to be in a range from 1,000 to 1,200 pounds per square inch. After the compressive forces form the material into a block, the block is removed by hand from the mold.

It is stated in the '679 patent that the resultant blocks produced by the machine are relatively smooth and close to dimension and, as a result, that thin mortar can be used when laying the blocks. This is said to reduce the labor costs and material costs of the construction.

Another more recent adobe block making machine is disclosed in U.S. Pat. No. 3,225,409. This machine is also wheeled for movement to the work site and also employs a horizontally moving ram to compress adobe material in a mold chamber. In this machine, however, the mold chamber is formed, by the sidewalls and bottom walls of an upwardly opened trough, by an end wall removably disposable in the trough opposite the ram which moves along the trough, and by a removable lid which closes the top of the trough. Dirt to be supplied to the mold chamber is situated in a bin supported above the trough. The bin, in turn, is supplied with dirt by a paddle arrangement which functions as an auger.

In operation of the '409 patent machine, the operator raises the lid over the trough and the operator moves dirt by hand from the bin to the trough. The lid is then closed by the operator and the end wall placed in position in the trough to form a compression chamber. The ram is then actuated to compress the dirt and form a block. Subsequent blocks are formed in a like manner until the trough is filled with blocks. At this point, each new block being formed can be compressed against the large flat face of the preceding block and the end wall need not be used.

The blocks formed with the '409 machine have length and width dimensions which correspond to the width and height of the trough and a thickness dimension which corresponds to the horizontal distance between the extended ram and the end wall. This patent thus takes the direction of compressing the block through its thickness and over a surface area corresponding to the largest surface of the block. As a result, the latter surface is in a position facing the ram so as to to enable use of a block as an end wall upon filling of the trough. As stated in the patent, the large flat face of the block is preferably 10 inches by 14 inches and the block has a thickness of 4 inches.

As can be appreciated, the above machines, to a large degree, depend upon the operator to load the machines and to remove formed blocks from the machines. The need to have the operator perform these functions, however, slows down the operating speed of the machines and the number of blocks produced per minute is relatively low.

In an attempt to increase machine output, designers of more recent adobe block making machines have moved in the direction of automating the aforementioned tasks previously carried out by the machine operators. Thus, these new machines have been designed so as to avoid the necessity of having to fill the compression chamber or mold by hand, as is necessary in the above machines. Also, they have been designed to better automate the process of ejecting a completed block from the mold chamber. In order to accomodate these additional features, machine designers have turned to machines which press from above, i.e., whose rams move vertically, and which press through the thickness and, thus, against the largest surface of a block.

In one such machine designed by applicant, the adobe containing dirt is gravity fed from a bin to an auger which carries the dirt to a moving drawer. The latter, in turn, conveys the dirt to a mold chamber which is open from the top and whose height, width an length correspond to the height, width and length of the block. A ram moving vertically along the chamber height then compresses the dirt to a pressure of about 1,200 pounds per square inch. The resultant block is then ejected from the chamber by opening of the chamber bottom wall.

While successfully automating the delivery and ejection processes, the latter type machines suffer from a variety of disadvantages. One significant disadvantage is that they press against the largest surface of a block. As a result, they require large ram assemblies. This, in turn, necessitates the use of heavy steel for the machine construction and large diesel motors for power. Power consumption and cost of materials is thus high making the overall cost of the machine high. Increased block output is therefore realized with these machines, but only at the expense of significantly increasing machine cost.

Another disadvantage of these automated machines is that they produce blocks having thicknesses which vary from block to block. This increases the labor and material costs attendant laying of the blocks, since mortar must now be provided between the blocks to maintain a level wall. This, in turn, makes the use of the machines even more expensive.

It is therefore an object of the present invention to provide an apparatus for making block which does not suffer from the above disadvantages.

It is a further object of the present invention to provide an apparatus for making block which is lighter in weight and which requires less power than previous machines.

It is yet another object of the present invention to provide an apparatus for making block which results in blocks of substantially uniform thickness and with variations only in their lengths, so that little or no adjustment requirements are needed when the blocks are laid.

It is still a further object of the invention to provide an apparatus for making block whose output is increased and whose cost is decreased as compared to previous machines.

SUMMARY OF THE INVENTION

In accordance with the principles of the present invention, the above and other objectives are realized in an apparatus comprising a horizontally extending channel which defines a first fill chamber for receiving the material to be compressed. A first compression chamber is disposed downstream of the first fill chamber and means, including a delivery chute opening into the first fill chamber, is provided for delivering material to the chamber. Further means is provided to coordinate and effect opening and closing of the delivery chute, movement of the delivered material from the fill chamber to the compression chamber, compression of the material delivered to the compression chamber and movement of the completed block from the latter chamber.

This further means includes a horizontally moving ram which on its forward stroke closes the delivery chute as it moves the material from the fill chamber to the compression chamber, which moves the completed block from the compression chamber, and which opens the chute upon the return stroke in passing through the fill chamber. In further accord with the invention the compression chamber has a height which is less than its width and length, and which corresponds to the block thickness.

With this configuration, the ram thus performs multiple functions and, furthermore, performs functions on both its forward and return strokes. Also, the ram moves horizontally compressing a block through its thickness and against its small side face. Since the amount of pressure per square inch required to form a block has been found to be the same and since pressure is now applied against the small face of the block, the overall pressure of the hydraulic system is decreased. The hydraulic cylinder can thus be of lighter weight and a much smaller power source can be used. This reduces the weight of the components of the machine itself and also reduces the weight of the supports needed for the machine. Consequently, a much lighter weight steel can be used for the machine which drastically reduces the cost of the machine.

In accordance with a further aspect of the present invention, the machine is further adapted to have an increased output in blocks per minute by providing that the channel define a second fill chamber and by including a second compression chamber downstream of this second fill chamber. A second delivery chute delivers material to the second fill chamber and the ram is provided with a first ram head which cooperates with the first fill chamber, first delivery chute and first compression chamber and with a second ram head which cooperates with the second fill chamber, second delivery chute and second compression chamber. The first and second ram heads move together and coordination of their movement is such that on the forward stroke of the ram, the second delivery chute is opened by the second ram head to fill the second fill chamber and the first delivery chute is closed by the first ram head as material is moved by the first ram head to the first compression chamber, compressed to form a block and the block moved to an ejection station. Similarly, after this block is formed, on the return stroke of the ram, the first delivery chute is opened by the first ram head to fill the first fill chamber and the second delivery chute is closed by the second ram head as material is moved by the second ram head to the second compression chamber, compressed to form a block and the block moved to an ejection station. It is this reciprocal activity which makes use of both the forward and return strokes of the ram which significantly enhances the output of the machine. Furthermore, this enhanced output is realized, while still obtaining the benefits of lighter weight and lower cost as compared to previous machines.

In the embodiments of the invention to be disclosed hereinafter each compression chamber includes a top wall which extends over the channel and a movable end wall. Each end wall closes its respective chamber during compression and is opened by the operation of a separate cylinder after block formation to allow passage of the formed block from the chamber. Also the material delivery chutes are fed by a bin and each chute has a lower opening whose width spans the width of the channel and whose length exceeds the length of the block to be formed by an amount which allows a sufficient length of the fill chamber to be filled to result in a block having the desired length.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
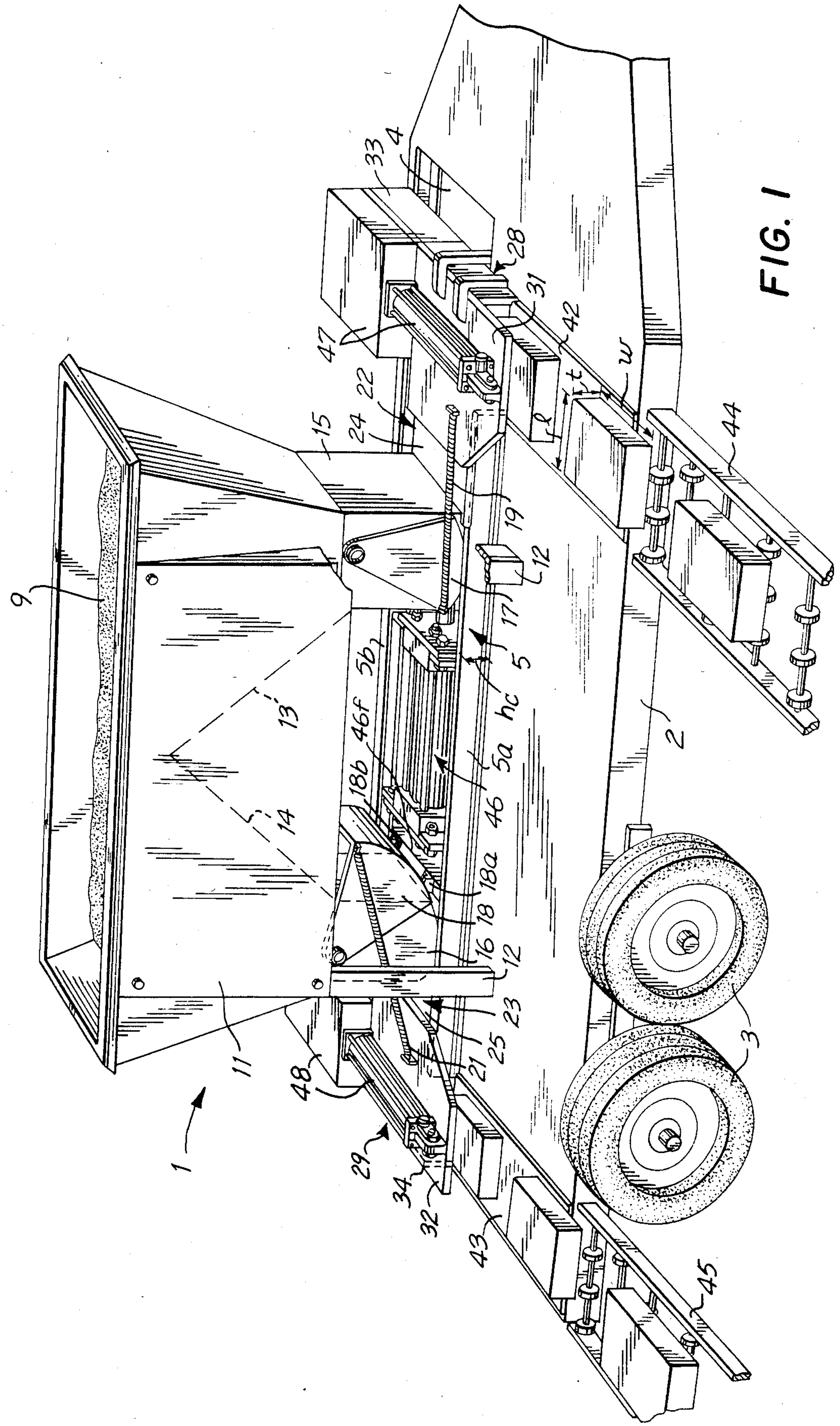
FIG. 1 shows an isometric view of an apparatus for making block in accordance with the principles of the present invention.

In FIG. 1, an apparatus 1 for making blocks in accordance with the invention is shown. The blocks are to be made from earth or soil material and, preferably, earth or soil material containing adobe. Such material shall be referred to hereinafter as "adobe material". Furthermore, the blocks are to have a thickness t, a length l and a width w. The thickness t is to be less than the width w and the length l and, for present purposes the length l is assumed to be less than the width w. Typical dimensions for t, l and w might be 4 inches, 10 inches and 14 inches, respectively and 4 inches, 8 inches and 12 inches respectively.

The apparatus 1 comprises a platform 2 which is mounted on tandem wheels 3 which allow the apparatus to be trailed to and from the construction site. Supported in an opening 4 in the platform is a channel member 5 having back and front walls 5*a* and 5*b* joined by a bottom wall 5*c*. The channel member 5 runs along the length of the platform 2 and has a height $h_c$ equal to the block height h and a with $w_c$ equal to the block width w.

At spaced positions along the length of the channel 5 the channel defines first and second fill chambers 6 and 7 for receiving the adobe material 9. The latter material is fed to the fill chambers from a bin 11 supported by struts 12 on the platform 2. The bin 11 is provided internally with slanted plates 13 and 14 which guide the material to first and second delivery chutes 15 and 16. The latter chutes overlie the fill chambers 6 and 7 and are provided at their open ends with pivotable doors 17 and 18. The doors 17 and 18 are biased in the closed position via springs 19 and 21. The open ends of the delivery chutes 15 and 16 have a width $w_d$ which is substantially equal to the channel width $w_c$ and a length $l_d$ which is greater than the length of the block to be formed. This greater length is such that sufficient adobe material is provided so that upon compression of the material as hereinbelow described, an adobe block having a length l results.

Downstream from the fill chambers 6 and 7 are respective compression chambers 22 and 23. Each of these compression chambers is formed by the sidewalls 5*a*, 5*b* and bottom wall 5*c* of the channel 5. Also, the compression chambers are further formed by top plates 24 and 25, respectively, which bridge the channel sidewalls 5*a* and 5*b*, and by movable end walls or doors 26*a* and 27*a*, respectively. The end walls 26*a* and 27*a* are side walls of respective movable ejection members 26 and 27 which can be brought into the channel for closing the channel across its width. As can be appreciated, therefore, the width of each compression chamber $w_{com}$ is equal to the channel width $w_c$, while the length of each compression chamber $l_{com}$ is equal to the length of its top wall, which length is selected to be greater than the block length l.

Further downstream from the compression chambers 22 and 23 are ejection stations 28 and 29. The ejection stations 28 and 29 comprise top walls 31 and 32, end walls 33 and 34 and bottom walls 35 and 36, respectively. These stations have open fronts 37 and 38 and open backs 39 and 41. Extending from the open fronts 37 and 38 on the platform 2 are plates 42 and 43. These plates are transverse to the channel 5 and lead to roller conveyors 44 and 45, respectively.

Between the fill chambers 6 and 7 in the channel 5 is disposed a ram assembly 46. The assembly 46 comprises a main body portion 46*a* which houses a cylinder (not shown) to whose opposite faces fluid can be applied via ports 46*b* and 46*c*. The cylinder carries a common shaft 46*d* having at its opposite ends ram heads 46*e* and 46*f*.

The ram head 46*e* cooperates with the fill chamber 6, delivery chute 15, pivotable door 17 and compression chamber 22. The ram head 46*f* on the other hand, cooperates with the fill chamber 7, delivery chute 16, pivotable door 18 and compression chamber 23. In particular, the pivotable doors 17 and 18 include flanges 17*a*, 17*b* (not visible) and 18*a*, and 18*b*, which ride on the back edges of their respective ram heads for opening and closing the doors.

Further ram assemblies 47 and 48 are provided at the ejection stations 28 and 29, respectively. These ram assemblies control the movement of the ejection members 26 and 27 housed at the stations 28 and 29. In particular, they control respective rams 47*a* and 48*a* (not visible) which move the ejection members through the ejection stations transverse to length of the channel 5.

Figure 2:
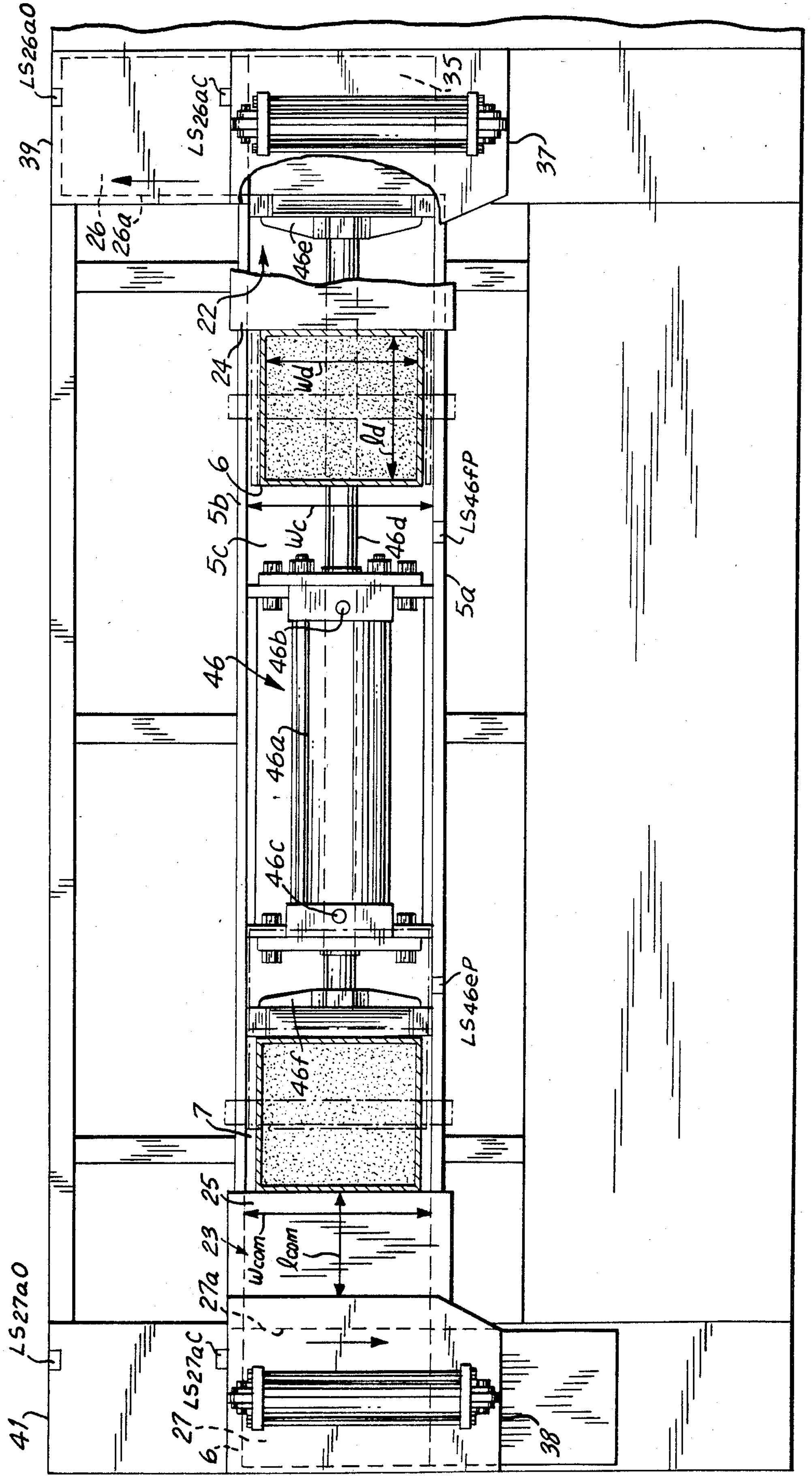
FIG. 2 illustrates a plan view of the apparatus of FIG. 1.
Figure 3:
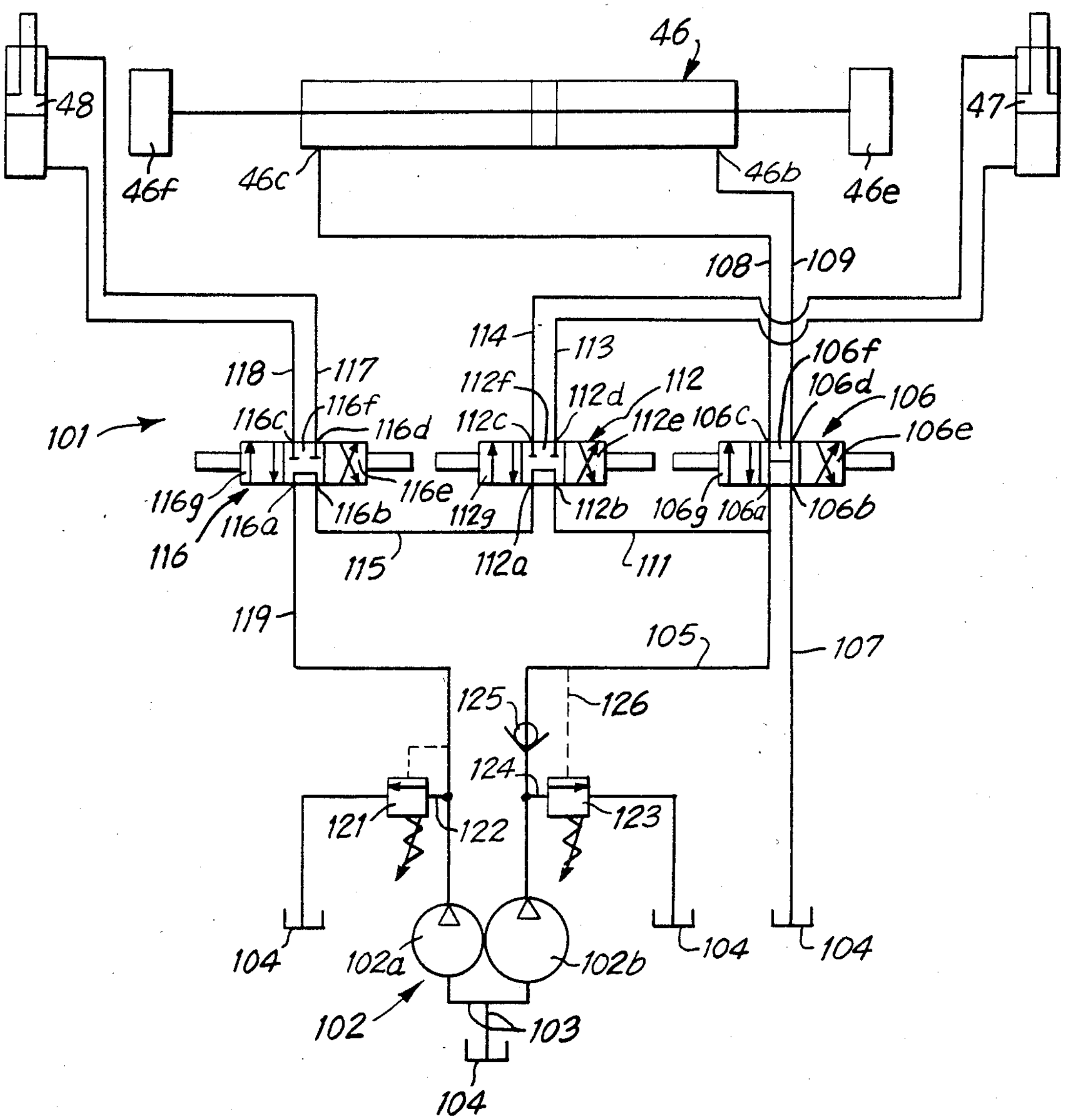
FIG. 3 shows pictorally, the hydraulic system for operating the apparatus of FIG. 1.

FIG. 3 shows pictorally the hydraulic system 101 for operating the apparatus 1 of FIGS. 1 and 2. As shown, the hydraulic system 101 comprises a double pump assembly 102. The assembly 102 is provided with small and large capacity pumps 102*a* and 102*b* both of which are coupled by conduit 103 to reservoir 104. The pump 102*b* feeds a conduit 105 which connects to a first port 106*a* of a four way double solenoid spring centered valve 106. The valve 106 includes valve sections 106*e*, 106*f* and 106*g* and has a second port 106*b* which is coupled by conduit 107 to the reservoir 104. The third and fourth ports 106*c* and 106*d* of the valve, in turn, connect via conduits 108 and 109 to ports 46*c* and 46*b* of the ram assembly 46.

Port 106*a* and valve 106 is also connected via conduit 111 to a first port of 112*b* of a further four way double solenoid spring centered valve 112. The valve 112 also has three valve sections 112*e*, 112*f* and 112*g*. Second and third ports 112*d* and 112*c* of the valve 112, in turn, connect to the forward and aft chambers of the ram assembly 47 via conduits 113 and 114. The fourth port 112*a* of the valve connects to its first port 112*b* and also via conduit 115 to a first port 116*b* of an additional four way valve 116 having valve sections 116*e*, 116*f*, 116*g*.

The valve 116 controls ram assembly 48 via valve ports 116*d* and 116*c* which connect through conduits 117 and 118 to the aft and forward chambers of the ram assembly. The final port 116*a* of the valve 116 is coupled to the port 116*b* and to a further conduit 119 which leads to the pump 102*a*.

A pressure relief valve 121 is coupled to the conduit 119 forward of the pump 102*a* via conduit 122. The other end of the relief valve is connected to the reservoir 104. An unloading valve 123, in turn, is coupled to the conduit 105 forward of the pump 102*b* via conduit 124. A right angle check valve 125 is also included in the conduit 105 between the pump 102*b* and the port 106*a* of the valve 106 and above the conduit 124.

Figure 4:
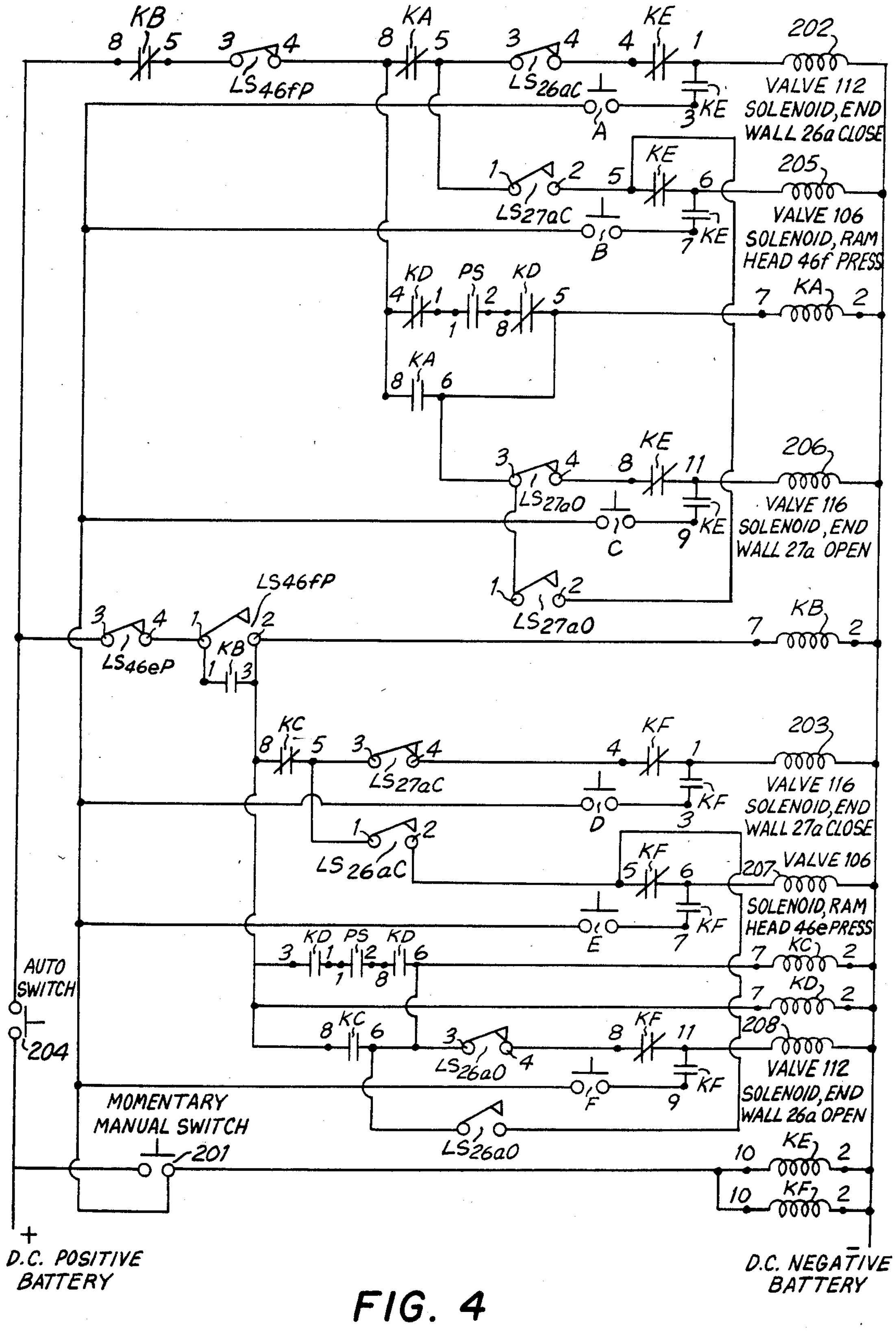
FIG. 4 shows schematically the electrical system for operating the apparatus of FIG. 1.

FIG. 4 depicts the schematic of the electrical system which is used in conjunction with the hydraulic system of FIG. 3 to operate the apparatus 1. In FIG. 4, the solenoid of a particular relay and the contacts controlled by that relay have been given the same letter designations. Thus, for example, the solenoid designated KA controls contacts designated KA and so on. Also, the particular valve in the hydraulic system of FIG. 3 controlled by a solenoid has been identified, as well as the function produced by such valve (e.g., valve 116 solenoid, end wall 27*a* close).

FIG. 4 additionally shows limits switches $LS_{26aC}$, $LS_{26aO}$, $LS_{27aO}$, $LS_{27aC}$, $LS_{46eP}$, $LS_{46fP}$. As can be seen, the limit switches $LS_{26aO}$ and $LS_{26aC}$ are associated with the assembly 28 and are indicative, respectively, of the ejection member 26 and end wall 26*a* being in closing and opening position relative to the channel 5. Likewise, the switches $LS_{27aO}$ and $LS_{27aC}$ are indicative of the ejection member 27 and end wall 27*a* being in opening and closing position relative to the channel. Finally, the switches $LS_{46eP}$ and $LS_{46fP}$ are associated with the ram assembly 46 and are indicative of the positions of the respective ram heads 46*e* and 46*f*.

As can be seen from FIG. 4, each of the mentioned limit switches has two pairs of contacts, one of which is closed and the other of which is open during any point in the operating sequence. In the presently illustrated situation of FIG. 4, the limit switches and relay contacts represent the unactivated and de-energized conditions of these elements. The operation of the apparatus 1 will be discussed in terms of forming a block in the compression chamber 23 via ram head 46*f*, it being understood that forming a block in compression chamber 22 via ram head 46*e* is a mirror image of that discussed for the chamber 23 and ram head 46*f*.

At the start of operation, momentary manual switch 201 is first closed, thereby energizing manual switches A and D and solenoids KE and KF. Switches A and D are thereafter activated causing end wall close solenoids 202 and 203 to operate via a current path through contacts 1–3 of switch KE and contacts 1–3 of switch KF, these contacts closing upon energization of solenoids KE and KF.

Energization of solenoids 202 and 203 causes the valve section 116*e* to control the flow of fluid through valve ports 116*a–d* of valve 116 and the valve section 112*g* to control the flow of fluid through the valve ports 112*a–d* of valve 112. With this configuration for the valves, the pump 102*a* delivers oil to the aft chambers of the assemblies 48 and 47 causing the ejection members 26 and 27 and, therefore, the end walls 26*a* and 27*a* to close and bridge the channel 5.

Switch 201 is then released deenergizing solenoids 202 and 203 and returning valves 116 and 112 to their central positions wherein sections 112*f* and 116*f* control fluid flow. Auto maintained switch 204 is then engaged allowing current to flow through press solenoid 205 via closed switch contacts 8–5 of switch KB, closed contacts 3–4 of limit switch $LS_{46fP}$, closed contacts 8–5 of switch KA, closed contacts 1–2 of limit switch $LS_{27aC}$ and closed contacts 5–6 of switch KE. Energization of solenoid 205, in turn, causes section 106*e* to control flow of fluid through valve 106 and pumps 102*a* and 102*b* to deliver oil thereto via the conduits 119 and 105.

Since the valves sections 116*f*, 112*f* and 106*e* now control the flow of fluid, the fluid flows into port 46*b* of ram assembly 46. Fluid is simultaneously extracted from port 46*c* of the assembly and delivered via valve section 106*e* to reservoir 104. This action causes ram head 46*f* to move to the left though channel 5, whereby it pushes the adobe material in fill chamber 7 into compression chamber 23 and simultaneously allows door 18 to close via displacement of the engagement position and final disengagement of the flanges 18*a*, 18*b*. Closing of the door 18 prevents further delivery of adobe material into the fill chamber 7 during the subsequent compression and ejection operations.

Continued delivery of fluid to the ram assembly port 46*b* by the pumps 102*a* and 102*b* causes the ram head 46*f* to compress the adobe material in the chamber 23 against closed end wall 27*a*. This compression continues until a predetermined pressure (i.e., a pressure of 1500 pounds per square inch in the hydraulic system corresponding to a pressure on the adobe material of 750 pounds per square inch) is reached. At this point, pilot line 126 signals unloading valve 123 to open.

Opening of valve 123 allows the fluid flow from pump 102*b* to be diverted to reservoir 104 at low pressure. However, the flow from pump 102*a* is prevented from returning to reservoir 104 through unloading valve 123 via chack valve 125. Pump 102*b* thus continues to supply pressurized fluid to the port 46*b* until the ram head 46*f* exerts the maximum pressure causing the adobe material to fuse into the desired block. After the adobe block is formed, a pressure switch PS, as shown in FIG. 4 senses that full pressure has been achieved and closes its contacts 1–2. A current path is thereby established to solenoid KA via contacts 8–5 of switch KB, contacts 3–4 of limit switch $LS_{46fP}$, contacts 4–1 of switch KD, contacts 1–2 of switch PS and contacts 8–5 of switch KD.

Energization of solenoid KA opens contacts 8–5 of switch KA stopping current flow to solenoid 205. This deenergizes the solenoid and causes the valve 106 to return to control of section 106*f*, thereby releasing the pressure on the ram head 46*f*. Also, energization of solenoid KA, closes contacts 8–6 of switch KA, whereby a current path to end wall open solenoid 206 is established through contacts 8–5 of switch KB, contacts 3–4 of limit switch $LS_{46fp}$, contacts 8–6 of switch KA, contacts 3–4 of limit switch $LS_{27aO}$ and contacts 8–11 of switch KE.

Energization of solenoid 206 causes control of valve 116 to be switched to section 116*g* of the valve. This, in turn, causes flow of fluid from pump 102*a* to the forward chamber of ram assembly 48 and release of fluid from the aft chamber. The ejection member 27 and therefor end wall 27*a* is thereby caused to move aft out of the channel 5.

When end wall 27*a* is fully out of the channel, the limit switch $LS_{27aO}$ is actuated. Contacts 3–4 of switch $LS_{27aO}$ then open and contacts 1–2 close. Valve solenoid 206 is thereby deenergized causing control of valve 116 to return to section 116*f*. Simultaneously, valve solenoid 205 is energized via a current path through contacts 1–2 of limit switch $LS_{27aO}$ and contacts 5–6 of switch KE. Activation of solenoid 205 again causes control of valve 106 to switch to section 106*e* and fluid again flows under the influence of pump 102*a* into port 46*b* and out of port 46*c* of ram assembly 46. The ram head 46*f* thereupon again exerts a force on the formed block in compression chamber 23, this time due to the opening of end wall 27*a*, pushing the block into ejection chamber 29.

When the ram head 46*f* has completed this movement, the limit switch $LS_{46fP}$ is actuated by the ram assembly. This causes contacts 3–4 of $LS_{46fP}$ to open and contacts 1–2 of $LS_{46fP}$ to close. Closure of the latter contacts energizes the KB solenoid which, in turn, opens contacts 8–5 of switch KB. The opening of the latter and contacts 3–4 of $LS_{46fP}$ deenergizes the solenoid 205 and the ram head 46*f* press functions. Deenergization of solenoid 205, in turn, returns control of valve 106 to section 106*f*, releasing pressure on ram head 46*f*.

The activation of solenoid KB also closes contacts 1–3 of switch KB establishing a current path through contacts 8–5 of switch KC, contacts 1–2 of $LS_{26aC}$, contacts 5–6 of switch KF to press solenoid 207. This begins the sequence of pressing a block via the ram head 46e which proceeds analogous to the above-described using solenoids 207, 203, KC and KD, end wall open valve solenoid 208, limit switches $LS_{26aC}$, and $LS_{26aO}$ and switches KB, KC, KD, PS and KF.

The apparatus 1 is now also conditioned to press with the latter ram head 46e. This conditioning occurs during the press stroke of the ram head 46f.* In particular, during the forward stroke of the latter ram head, the ram head 46e is carried by the common shaft of ram assembly 46 from the compression chamber 28 through the fill chamber 6. In passing through the latter chamber, the flanges of the door 17 become engaged by ram head 46e overcoming the force of spring 19 to open the door 17. This allows adobe material to be gravity fed to the fill chamber 6 from the chute 15, thereby charging the chamber for subsequent formation of a block by ram head 46e.

*i.e., during compression and subsequent movement of a formed block into the ejection station 29.

After the ram head 46e has formed a block and delivered it to the ejection station 28, the above process of pressing with the ram head 46f is again initiated. At this point, the initial closing of the channel 5 by the ejection member 27 and end wall 27a occurs automatically via a current path established at the end of the press cycle of the ram head 46e. This path leads to solenoid 202 though contacts 8–5 of switch KB, contacts 3–4 of limit switch $LS_{46fP}$, contacts 8–5 of switch KA, contacts 3–4 of limit switch $LS_{26aC}$ and contacts 4–1 of switch KE. Closing of the channel 5 by the movement of ejection member 26 forward (transverse to the channel 5), in turn, causes ejection of the block from the ejection station 29 and delivery of same to the plate 43 situated transverse of the channel. Similarly, on the next cycle of the ram head 46e, the adobe block formed on the previous cycle is ejected from the station 28 via closing of the channel 5 by forward movement of the ejection member 26.

It is important to note that the configuration of the channel 5 of the apparatus 1 is such that block formation and ejection is accomplished in such a manner that compression forces are executed horizontally and only on a small side face of the block being formed as opposed to the large flat face of the block. This permits, as mentioned previously, ram assembly 46 and the energy source for powering the assembly to be lighter than heretofore utilized, thereby greatly decreasing the weight and power requirements of the apparatus. As a result, the cost of the apparatus is likewise significantly decreased.

Furthermore, since blocks are formed automatically by exerting a force transverse to the block thickness, the resultant thickness dimension is substantially uniform. This permits the blocks to be laid without the use of cement. Material and labor costs are thus also substantially reduced.

As can also be appreciated, the apparatus 1, as described above, makes maximum use of both the forward and reverse strokes of the ram assembly in that a block is formed on each stroke. As a result, the output rate of the apparatus in blocks per minute is significantly increased and an overall more productive, less costly apparatus is realized. Also, the individual ram heads perform multiple functions during operation of the assembly. Thus, each head moves material from its fill chamber to its compression chamber while simultaneously allowing the door to the delivery chute feeding material to the fill chamber to be closed. This inhibits further filling of the fill chamber until on the reverse stroke the ram head allows the door to the delivery chute to open. Adobe material is then again permitted to fill the fill chamber.

In a further aspect of the invention, the apparatus of FIG. 1 is modified so that it forms blocks only on the forward stroke of the ram assembly. In particular the apparatus 1 is modified so that it includes a sole ram head, delivery chute, fill chamber, compression chamber and ejection chamber. In essence, the modified apparatus comprises either the left hand or right hand side of the apparatus of FIG. 1

In such a modified apparatus, it has been found that instead of using a single clyinder for the ram assembly, as in the FIG. 1 apparatus, two smaller cylinders can be used. This, in turn, permits the door of the delivery chute to be a flat plate instead of the pivotable type members (17 or 18) shown in FIG. 1. This plate is situated between the channel and the chute and is moved horizontally by engagement of its respective flanges.

While such a modified apparatus has a lower output of blocks per minute, it also is lighter in weight and requires less power and components. Accordingly, it is less expensive and is affordable by the home user. This is particularly so, if the machine is adapted to make smaller blocks of the 4 inch by 8 inch by 12 inch size.

Both the apparatus of FIG. 1 and the above-described modified apparatus have been constructed for production of blocks of various sizes. Typically, an apparatus 1 for manufacturing blocks of four inches by ten inches by fourteen inches can operate at an output rate of 14–16 blocks per minute. Such an apparatus, if it is adapted to press a block against the small four inch by fourteen inch side at a minimum pressure of about 1200 pounds per square inch, would have to withstand equivalent weights of about 33–34 tons. A seven inch diameter ram cylinder having a three inch diamter shaft can accomodate these conditions and is usable for the ram assembly. Also, the power source for the apparatus can be a 76 horsepower diesel motor operating at about 180 rpm. The hydraulic system, in turn, would then be run at about 82 gallons per minute, with the small capacity pump contributing 25 gallons per minute and the large cpacity pump 57 gallons per minute. The pressure of the system, moreover would be approximately 2100 to 2900 pounds per square inch from minimum to maximum.

In the case of the modified apparatus, the rate of manufacture can be from 2 to 4 blocks per minute. If the apparatus is adapted to produce blocks of 4 inches by 8 inches by 12 inches by pressing against the small 4 inch by 12 inch side, two four inch diameter ram cylinders can be employed. The power source for the hydraulic system can be a gas motor of 10 or 16 horsepower, the larger horsepower motor for producing blocks at the 4 per minute rate and the smaller horsepower motor at the 2 per minute rate. The hydraulic system would operate in a pressure range from 1800 to 2500 pounds per square inch and the pumps of the system at rates of 11 and 22 gallons per minute at a motor speed of 3600 rpm.

In all cases, it is understood that the above-described arrangements are merely illustrative of the many possible specific embodiments which represent applications of the present invention. Numerous and varied other arrangements can readily be devised in accordance with the principles of the present invention without departing from the spirit and scope of the invention.

What is claimed is:

1. Apparatus for making blocks from earth, soil or like material comprising
a channel;
a fill chamber formed by said channel at a position along said channel;
a compression chamber disposed downstream of said fill chamber;
means for feeding said material to said fill chamber;
and first means for: during a first cycle and while inhibiting said feeding means from feeding material to said fill chamber, moving said material from said fill chamber to said compression chamber to compress said material to form a block and moving said block from said compression chamber; and, during a second cycle, enabling said feeding means to feed material to said fill chamber.

2. Apparatus in accordance with claim 1 wherein:
said channel is horizontal and includes: first and second side walls situated transverse to said channel length and a bottom wall connecting said side walls, said channel being open from the top;
said compression chamber includes: a top wall extending between the side walls of said channel at the position of said compression chamber; and an end wall; whereby the said compression chamber is formed by the first and second side walls and the bottom wall of the channel and by said top wall and said end wall;
the height of said first and second side walls is less than the transverse distance between said sidewalls;
and the length of said top wall measured along the length of said channel from said end wall and over which said formed block extends is greater than said height of said first and second side walls.

3. Apparatus in accordance with claim 2 wherein:
said height, said transverse distance and said first top wall length correspond to the thickness, width and length of said formed block.

4. Apparatus in accordance with claim 3 wherein:
said height, transverse distance and said first top wall length are equal to four inches, fourteen inches and ten inches, respectively.

5. Apparatus in accordance with claim 3 wherein:
said height, transverse distance and said first top wall length are equal to four inches, twelve inches and eight inches, respectively.

6. Apparatus in accordance with claim 2 wherein:
said first means includes: a ram assembly including a ram head mounted in said channel so that said ram head moves horizontally.

7. Apparatus in accordance with claim 2 wherein:
said feeding means includes a movable door for opening and closing said feeding means;
and said first means during said first cycle enables said movable door to close said feeding means and during said second cycle enables said door to open said feeding means.

8. Apparatus in accordance with claim 2 wherein:
said end wall of said chamber is movable into and out of said channel and during said first cycle is moved into said channel to enable compression of said material and is then moved out of said channel to enable said formed block to be moved from said compression chamber.

9. Apparatus in accordance with claim 8 further comprising:
an ejection station disposed downstream from said compression chamber for receiving the formed block moved from said compression chamber and including an ejection member for moving said block transverse to said channel.

10. Apparatus in accordance with claim 9 wherein;
a side wall of said ejection member forms said movable end wall of said compression chamber;
and said ejection member is moved to bring said side wall into said channel during said first cycle and simultaneously therewith moves the block formed during the previous first cycle in said direction transverse to said channel.

11. Apparatus in acordance with claim 10 wherein:
said first means comprises: a ram assembly mounted in said channel forward of said fill chamber, said ram assembly including a horizontally mounted ram head, and said ram head during said first cycle undergoing a forward stroke and during said second cycle a reverse stroke.

12. Apparatus in accordance with claim 11 wherein:
said first means further comprises: hydraulic means for activating said ram head and said ejection member; and electrical means including limit switch means responsive to the position of said ram head and said ejection member for controlling said hydraulic means.

13. Apparatus in accordance with claim 12 wherein:
said ejection station further includes a further ram assembly responsive to said hydraulic means;
and said controlling of said hydraulic means is such that during said first cycle: said further ram assembly is caused to move said ejection member into said channel and said ram head is moved under pressure to compress said material against said end wall to form a block; said ram head is then released from pressure and said further ram assembly is caused to move said ejection member out of said channel; and said ram head is then again placed under pressure to move said formed block from said compression chamber to said ejection station.

14. Apparatus in accordance with claim 13 wherein:
said feeding means comprises: a bin for receiving said material, said bin having a first delivery chute opening into said fill chamber; a door movably mounted to said chute, said door being biased to close said opening of said chute and having a downwardly extending flange;
and said ram head during said reverse stroke in moving from said compression chamber through said fill chamber engaging said flange to act against said bias and open said delivery chute opening allowing material to pass from said chute to said fill chamber and during said forward stroke in passing from said fill chamber to said compression chamber reducing its engagement of said flange to permit said bias to close said delivery chute opening preventing material from passing from said chute to said fill chamber.

15. Apparatus for making blocks from earth, soil or like material comprising:
a channel;
first and second fill chambers formed by said channel at spaced positions along said channel;
first and second compression chambers disposed downstream of said first and second fill chambers, respectively;

means for feeding said material to said first and second fill chambers;

and first means for: during a first cycle and while inhibiting said feeding means from feeding material to said first fill chamber and enabling said feeding means to feed material to said second fill chamber, moving said material from said first fill chamber to said first compression chamber to compress said material to form a block and for moving said block from said first compression chamber; and, during a second cycle and while inhibiting said feeding means from feeding material to said second fill chamber and enabling said feeding means to feed material to said first fill chamber, moving said material from said second fill chamber to said second compression chamber to compress said material to form a block and for moving said block from said second compression chamber.

16. Apparatus in accordance with claim 15 wherein:

said channel is horizontal and includes first and second side walls transverse to said channel length and a bottom wall connecting said side walls, said channel being open from the top;

said first and second compression chambers include first and second top walls and first and second end walls, each top wall extending between the upper ends of the side walls of said channel at the position of the respective compression chamber, whereby each compression chamber is formed by the first and second side walls and the bottom wall of the channel and by its respective top wall and end wall;

the height of said first and second side walls is less than the transverse distance between said side walls;

and the length of each of said top walls measured along the length of said channel from the corresponding end wall and over which the respective formed block extends is greater than said height of said first and second side walls.

17. Apparatus in accordance with claim 16 wherein:

said first means comprises: a ram assembly mounted in said channel between said first and second fill chambers, said ram assembling including first and second horizontally mounted ram heads disposed at opposite ends of said ram assembly, said first and second ram heads being connected so as to move together and said first ram head cooperating with said first fill chamber and first compression chamber and said second ram head cooperating with said second fill chamber and said second compression chamber.

18. Apparatus in accordance with claim 17 further comprising:

first and second ejection stations disposed downstream of said first and second compression chambers for receiving blocks moved therefrom, said first and second ejection stations including first and second ejection members movable transverse to said channel to open and close said channel and to move blocks received from said first and second compression chambers transverse to said channel; and first and second side walls of said first and second ejection members forming said first and second end walls of said first and second compression chambers.

19. Apparatus in accordance with claim 18 wherein:

said first means further comprises: hydraulic means for activating said first and second ram heads and said first and second ejection members; and electrical means including limit switch means responsive to the positions of said first and second ram heads and said first and second ejection members for controlling said hydraulic means.

20. A method of operating an apparatus for forming a block from earth, soil or like material, the apparatus comprising: a channel; a fill chamber formed by said channel at a position along said channel; a compression chamber disposed downstream of said first fill chamber; means for feeding said material to said fill chamber; and first means for: during a first cycle and while inhibiting said feeding means from feeding material to said fill chamber, moving said material from said fill chamber to said compression chamber to compress said material to form a block and moving said block from said compression chamber; and, during a second cycle, enabling said feeding means to feed said material to said fill chamber;

the method comprising:

supplying said material to said feeding means;

and activating said first means to form a block.

21. A method in accordance with claim 20 wherein:

said material comprises adobe.

* * * * *